United States Patent
Lindoff et al.

(10) Patent No.: US 12,348,260 B2
(45) Date of Patent: Jul. 1, 2025

(54) FREQUENCY GENERATION OF A MULTI-ANTENNA TRANSCEIVER SYSTEM

(71) Applicant: BEAMMWAVE AB, Lund (SE)

(72) Inventors: Bengt Lindoff, Bjärred (SE); Per-Olof Brandt, Lomma (SE); Jonas Lindstrand, Lund (SE)

(73) Assignee: BEAMMWAVE AB, Lund (SE)

( * ) Notice: Subject to any disclaimer, the term of this patent is extended or adjusted under 35 U.S.C. 154(b) by 37 days.

(21) Appl. No.: 18/030,737

(22) PCT Filed: Oct. 7, 2021

(86) PCT No.: PCT/EP2021/077646
§ 371 (c)(1),
(2) Date: Apr. 6, 2023

(87) PCT Pub. No.: WO2022/074097
PCT Pub. Date: Apr. 14, 2022

(65) Prior Publication Data
US 2023/0318655 A1    Oct. 5, 2023

(30) Foreign Application Priority Data
Oct. 9, 2020 (EP) .................................... 20200969

(51) Int. Cl.
*H04B 1/403* (2015.01)
(52) U.S. Cl.
CPC .................... *H04B 1/403* (2013.01)
(58) Field of Classification Search
CPC .... H04B 1/0082; H04B 1/0483; H04B 1/403; H04B 10/40; H04B 1/401; H04B 15/06;
(Continued)

(56) References Cited

U.S. PATENT DOCUMENTS

| | | | | |
|---|---|---|---|---|
| 4,989,175 A | * | 1/1991 | Boris | ............. G01R 31/318555 |
| | | | | 713/401 |
| 5,043,596 A | * | 8/1991 | Masuda | .................... G06F 1/10 |
| | | | | 327/295 |

(Continued)

OTHER PUBLICATIONS

Agrawal et al. "2.2 A scalable 28GHz coupled-PLL in 65nm CMOS with single-wire synchronization for large-scale 5G mm-wave arrays," 2016 IEEE International Solid-State Circuits Conference (ISSCC), San Francisco, CA, USA, 2016, pp. 38-39, doi: 10.1109/ISSCC.2016.7417895. (Year: 2016).*

(Continued)

*Primary Examiner* — Sophia Vlahos
(74) *Attorney, Agent, or Firm* — MARSHALL, GERSTEIN & BORUN LLP (57) ABSTRACT

A multi-antenna transceiver system including a group of transceiver chips, and a reference frequency generator configured to provide a reference frequency for each transceiver chip. Each transceiver chip has a respective chip-associated (e.g., on-chip) frequency generator configured to provide a respective conversion frequency based on the reference frequency, wherein each respective conversion frequency is higher than the reference frequency. Each transceiver chip is configured to use the respective conversion frequency for on-chip frequency conversion of a transceiver signal. The reference frequency may be provided directly to each transceiver chip of the group or may be provided directly to a first transceiver chip of the group and to a second transceiver chip of the group via the first transceiver chip. The multi-antenna transceiver system may also include baseband processing circuitry configured to process transceiver signals for the transceiver chips, wherein the baseband processing circuitry may be further configured to estimate a first respective phase shift of each respective chip-associated frequency (Continued)

generator, and compensate the transceiver signals based on the first respective phase shifts.

14 Claims, 4 Drawing Sheets

(58) Field of Classification Search
CPC . H04L 2027/0016; G06F 1/04; G06F 15/7825
See application file for complete search history.

(56) References Cited

U.S. PATENT DOCUMENTS

| | | | | |
|---|---|---|---|---|
| 7,616,929 | B2* | 11/2009 | Behzad | H04B 7/00 455/115.2 |
| 8,031,024 | B1* | 10/2011 | Zaslavsky | H03L 1/026 455/76 |
| 9,401,801 | B1* | 7/2016 | Park | H04B 15/06 |
| 11,323,145 | B2* | 5/2022 | Rafique | H04B 1/401 |
| 2006/0221905 | A1* | 10/2006 | Behzad | H04B 1/40 370/335 |
| 2007/0149143 | A1 | 6/2007 | Kim et al. | |
| 2010/0278538 | A1* | 11/2010 | Guidotti | H04B 10/90 398/115 |
| 2011/0299456 | A1* | 12/2011 | Schmidt | H04B 7/0615 370/328 |
| 2015/0079912 | A1* | 3/2015 | Dehos | H04B 1/408 455/76 |
| 2016/0056987 | A1* | 2/2016 | Choi | H04W 56/0035 375/295 |
| 2018/0156870 | A1* | 6/2018 | Kim | G01R 31/286 |
| 2018/0359018 | A1* | 12/2018 | Ling | H04B 7/0868 |
| 2019/0293755 | A1* | 9/2019 | Cohen | G01S 7/295 |
| 2020/0003882 | A1 | 1/2020 | Salle et al. | |

OTHER PUBLICATIONS

European Search Report, European Application No. 20200969.2, dated Feb. 16, 2021.
Ek et al., "A 28-nm FD-SOI 115-fs Jitter PLL-Based LO System for 24-30-GHz Sliding-IF 5G Transceivers", IEEE Journal of Solid-State Circuits, IEEE, USA, vol. 53, No. 7, Jul. 1, 2018, pp. 1988-2000.
Kucharski et al., "A Scalable 79-GHz Radar Platform Based on Single-Channel Transceivers", IEEE Transactions on Microwave Theory and Techniques, Plenum, USA, vol. 67, No. 9, Sep. 1, 2019, pp. 3882-3896.
International Search Report and Written Opinion, International Application No. PCT/EP2021/077646, mailed on Jan. 31, 2022.

* cited by examiner

FREQUENCY GENERATION OF A MULTI-ANTENNA TRANSCEIVER SYSTEM

TECHNICAL FIELD

The present disclosure relates generally to the field of multi-antenna transceiver systems. More particularly, it relates to generation of conversion frequencies in multi-antenna transceiver systems.

BACKGROUND

A multi-antenna transceiver may be constructed using a plurality of transceiver chips, wherein each transceiver chip is associated with one or more corresponding antenna elements. A frequency generator can provide a signal indicative of a conversion frequency to each of the transceiver chips, for on-chip frequency conversion of a transceiver signal in each of the transceiver chips.

The provision of the signal from the frequency generator to each of the transceiver chips may be problematic. Such problems may be particularly prominent for relatively high conversion frequencies. For example, transferring the signal between the frequency generator and a transceiver chip may introduce interference. Alternatively or additionally, transferring the signal between the frequency generator and a transceiver chip may cause power dissipation.

Therefore, there is a need for alternative approaches to conversion frequency provision for multi-antenna transceiver systems.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a multi-antenna transceiver system comprising a group of transceiver chips and a reference frequency generator configured to provide a reference frequency for each transceiver chip of the group.

Each transceiver chip has a respective chip-associated frequency generator configured to provide a respective conversion frequency based on the reference frequency, wherein each respective conversion frequency is higher than the reference frequency, and each transceiver chip is configured to use the respective conversion frequency for on-chip frequency conversion of a transceiver signal.

In some embodiments, the group of transceiver chips comprises two or more disjunct groups of transceiver chips and the reference frequency generator comprises a respective reference frequency generator for each group of transceiver chips.

In some embodiments, the reference frequency is provided directly to each transceiver chip of the group.

In some embodiments, the reference frequency is provided directly to a first transceiver chip of the group, and the reference frequency is provided via the first transceiver chip to a second transceiver chip of the group.

In some embodiments, the multi-antenna transceiver system further comprises baseband processing circuitry configured to process transceiver signals for the transceiver chips.

In some embodiments, the baseband processing circuitry is further configured to estimate a first respective phase shift of each respective chip-associated frequency generator, and compensate the transceiver signals based on the first respective phase shifts.

In some embodiments, the baseband processing circuitry is further configured to estimate a frequency error for the respective chip-associated frequency generators, and control the reference frequency generator based on the frequency error.

In some embodiments, the baseband processing circuitry is further configured to estimate baseband correlation timing for at least one transceiver chip, and control baseband correlation for at least one other transceiver chip based on the estimated baseband correlation timing.

In some embodiments, the baseband processing circuitry is further configured to acquire a second respective phase shift for each transceiver chip, and compensate the transceiver signals based on the second respective phase shifts.

In some embodiments, the second respective phase shifts are associated with relative mounting positions of the transceiver chips.

In some embodiments, each respective conversion frequency is higher than 24 GHz (e.g., 24-300 GHz) and/or the reference frequency is lower than 1 GHz (e.g., 150-500 MHz).

A second aspect is a baseband processor for a multi-antenna transceiver system. The baseband processor is configured to process transceiver signals for a group of transceiver chips comprised in the multi-antenna transceiver system, wherein each transceiver chip has a respective chip-associated frequency generator configured to provide a respective conversion frequency based on a reference frequency provided by a reference frequency generator comprised in the multi-antenna transceiver system, and wherein each respective conversion frequency is higher than the reference frequency.

The baseband processor comprises baseband processing circuitry configured to estimate a first respective phase shift of each respective chip-associated frequency generator, and compensate the transceiver signals based on the first respective phase shifts.

A third aspect is a network node comprising the multi-antenna transceiver system of the first aspect and/or the baseband processor of the second aspect.

A fourth aspect is a wireless communication device comprising the multi-antenna transceiver system of the first aspect and/or the baseband processor of the second aspect.

A fifth aspect is a method for operating a multi-antenna transceiver system comprising a group of transceiver chips and a reference frequency generator, wherein the reference frequency generator is configured to provide a reference frequency for each transceiver chip of the group, wherein each transceiver chip has a respective chip-associated frequency generator configured to provide a respective conversion frequency based on the reference frequency, each respective conversion frequency being higher than the reference frequency, and wherein each transceiver chip is configured to use the respective conversion frequency for on-chip frequency conversion of a transceiver signal.

The method comprises estimating a first respective phase shift of each respective chip-associated frequency generator, and compensating the transceiver signal based on the first respective phase shifts.

A sixth aspect is a computer program product comprising a non-transitory computer readable medium, having thereon a computer program comprising program instructions. The computer program is loadable into a data processing unit and configured to cause execution of the method according to the fifth aspect when the computer program is run by the data processing unit.

In some embodiments, any of the above aspects may additionally have features identical with or corresponding to any of the various features as explained above for any of the other aspects.

An advantage of some embodiments is that alternative (e.g., improved) approaches to conversion frequency provision for multi-antenna transceiver systems are provided.

An advantage of some embodiments is that interference and/or power dissipation caused by signal transfer between the common frequency generator and the transceiver chip is reduced compared to prior art approaches. Since the signal transfer is for the reference frequency—which is lower than the conversion frequency—transfer problems that are more severe at relatively high frequencies are mitigated. Signal transfer for the conversion frequency can be constrained to on-chip transfer only, or to between-chip distances which are comparatively short and/or otherwise advantageous.

An advantage of some embodiments is that implementation, e.g., printed circuit board (PCB) design, for multi-antenna transceivers is simplified compared to the prior art. For example, the impact of any implementation process variations may be reduced.

An advantage of some embodiments is that received signal combining can be made coherently over transceiver chips. Since phase differences between transceiver chips (which is, e.g., introduced by phase offsets in the chip-associated frequency generators and/or due to phase shifts introduced by received signal transfer from the transceiver chips to the baseband circuitry) are estimated and compensated for, coherent combining is feasible.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

Generally, when provision/use/etc. of a frequency is referred to herein, it may be understood as including provision/use/etc. of a signal which is indicative of the frequency.

Also generally, when an antenna element is referred to herein, it may be a constituent antenna of a multi-antenna arrangement (e.g., an antenna array, and antenna matrix, an antenna panel, etc.), for example.

Also generally, although up-conversion and down-conversion is exemplified herein as being between radio frequency and baseband frequency, it should be understood that embodiments may be equally applicable for up-conversion and/or down-conversion via one or more intermediate frequencies.

Furthermore, when a functional unit of a transceiver chain is referred to herein (e.g., ADC, DAC, frequency converter, mixer, filter, etc.), it should be understood that such reference may include a pair of functional units for in-phase/quadrature processing.

Multi-antenna transceivers may be used for multiple-input multiple-output (MIMO; e.g., massive MIMO or traditional MIMO) communication and/or for beamformed communication (e.g., transmission pre-coding and/or reception combining). In such applications, the baseband content is typically the same for some (e.g., all) transceiver chips, while the transmitted/received signals typically differ between antenna elements. Thus, the baseband processing may typically comprise processing of a radio signal which is simultaneously received or transmitted by the different antenna elements, on the same carrier frequency.

In some embodiments, the multi-antenna transceiver systems presented herein, or part thereof, may be particularly suitable for massive MIMO and/or beamforming.

Generally, transceiver architectures for massive MIMO and/or beamforming may be implemented using analog multi-antenna control, digital multi-antenna control, or hybrid multi-antenna control.

With analog multi-antenna control, beamforming is typically performed at radio frequency (RF) using a bank of phase shifters (one per antenna element), an analog power combiner for the receiver, and a power splitter for the transmitter. This typically requires only one analog-to-digital converter (ADC) instance (typically a pair of ADCs for in-phase/quadrature conversion) and one digital-to-analog converter (DAC) instance (typically a pair of DACs for in-phase/quadrature conversion) for the receiver and transmitter, respectively, which reduces the complexity compared to when more ADC/DAC instances are needed. The antenna elements may be clustered and implemented in the form of an antenna panel.

With digital multi-antenna control, beamforming is typically performed at baseband frequency (e.g., in a digital baseband processor). Typically, each transceiver chain requires an ADC instance (typically a pair of ADCs) and a DAC instance (typically a pair of DACs). A digital beamforming transceiver may be configured to simultaneously direct beams in, at least theoretically, an infinite number of directions. Thus, digital beamforming transceivers are superior at tracking radio signals (e.g., when mobile devices move fast relative to the radio base station).

As mentioned before, a (digital) multi-antenna transceiver may be constructed using a plurality of transceiver chips and a frequency generator providing a conversion frequency to each of the transceiver chips.

Figure 1:
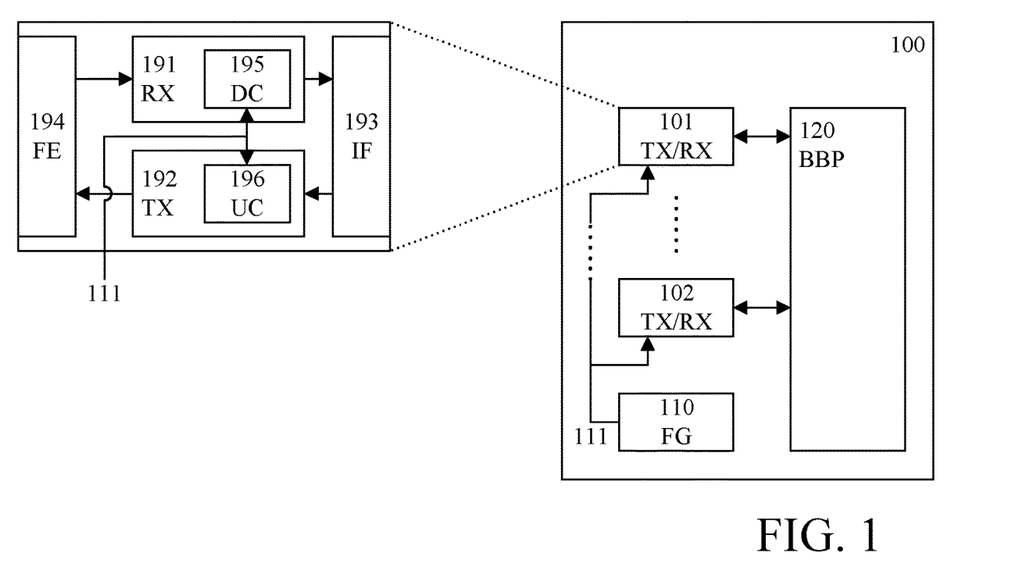
FIG. 1 is a schematic block diagram illustrating an example multi-antenna transceiver system with a single frequency generator.

FIG. 1 schematically illustrates an example multi-antenna transceiver system 100 with a plurality of transceiver chips (TX/RX) 101, 102 and a single frequency generator (FG) 110 providing the conversion frequency 111 to each of the transceiver chips. The example system 100 also comprises a baseband processor (BBP) 120 configured to process transceiver signals for the transceiver chips.

An example schematic architecture for a transceiver chip 101, 102 is illustrated in FIG. 1.

The example architecture comprises a receiver path (RX) 191 and a transmitter path (TX) 192. The receiver path comprises a down-converter (DC) 195 and the transmitter path comprises an up-converter (UC) 196. The down-converter and up-converter each receives the conversion frequency from the frequency generator for on-chip frequency conversion of a transceiver signal (i.e., down-conversion of a received signal in the receiver path and/or up-conversion in the transmitter path of a signal to be transmitted).

The receiver path 191 and the transmitter path 192 may generally comprise any suitable functional and/or physical components (e.g., as known in the art). The receiver path may, for example, comprise a low-noise amplifier (LNA), mixer circuitry (for down-conversion), one or more filters (e.g., a low-pass filter; LPF), and a variable gain amplifier. The transmitter may, for example, comprise one or more filters (e.g., a low-pass filter; LPF), mixer circuitry (for up-conversion), and a power amplifier (PA).

Furthermore, the example architecture for a transceiver chip comprises a front end (FE) 194 and an interface (IF) 193. The interface 193 is for connection to the baseband processor 120, and can have any suitable functional and/or physical components (e.g., as known in the art).

The front-end 194 may be for connection to one or more antenna elements or may comprise one or more on-chip antenna elements. Thus, each transceiver chip 101, 102 of the multi-antenna transceiver system 100 is associated with one or more corresponding antenna elements. Furthermore, the front-end 194 may comprise any suitable functional and/or physical components (e.g., as known in the art). For example, the front end 194 may comprise duplexer or diplexer circuitry (e.g., switching circuitry, filters, etc.) for separation of received signals from signals to be transmitted.

Thus, in typical digital beamforming solutions with the transceivers associated with different antenna elements provided on different RF chips (compare with transceiver chips 101, 102), a single Local Oscillator (LO; compare with the frequency generator 110) is used to generate the carrier (with frequency $f_c$; compare with 111) for down-conversion and/or up-conversion, and the generated carrier is distributed to all of the RF chips.

The RF signal for RF chip i, i=1, . . . , N, can be represented as $S_i(t)e^{j2\pi f_c t}$. The LO signal 111 can be represented as $e^{j(2\pi f_c t+\varphi)}$ and typically has an unknown phase $\varphi$ which will phase shift the baseband signal $S_i(t)$ to $S_i(t)e^{j\varphi}$ for RF chip i, i=1, . . . , N. However, the phase shift is typically the same for all RF chips, so a channel estimator operating in baseband frequency may consider the unknown phase shift as part of the overall channel to be estimated. Hence, coherent combining of received signals $S_i(t)$ can be achieved without particularly addressing the unknown phase shift.

However, as mentioned before, the provision of the signal from the frequency generator to each of the transceiver chips may be problematic (e.g., in terms of interference and/or power dissipation); in particular for relatively high conversion frequencies. For example, if a digital beamforming architecture as described in association with FIG. 1 is applied for millimeter wavelength (mmWave) frequencies (e.g., above 24 GHz), the routing of the conversion frequency signal 111 in mmWave frequencies over a Printed Circuit Board (PCB) typically gives rise to significant power dissipation and interference challenges. Hence, such approaches are generally not feasible for mmWave frequencies; especially not in size and/or power constrained devices (e.g., handheld user devices).

In the following, embodiments will be described where the conversion frequency for on-chip frequency conversion of the transceiver signal in multi-antenna transceiver systems is provided in a new and beneficial way.

Generally, some embodiments are particularly suitable for scenarios with relatively high conversion frequency (e.g., mmW frequency), but application of the embodiments is not limited thereto.

Also generally, some embodiments are particularly suitable for massive MIMO and or precision beamforming, but application of the embodiments is not limited thereto.

Also generally, any of the multi-antenna transceiver systems, and/or transceiver chips/packages, and/or baseband processors, and/or frequency generators (reference, on-chip, or chip associated) described herein may be for (e.g., comprisable—or comprised—in) any suitable communication apparatus. Example suitable communication apparatuses include network nodes (e.g., base station, access point (AP), fixed wireless access (FWA) unit, non-terrestrial transceiver—such as satellite or unmanned aerial vehicle (UAV), etc.) and wireless communication devices (e.g., user equipment (UE), station (STA), Internet of Things (IoT) device, etc.).

Figure 2:
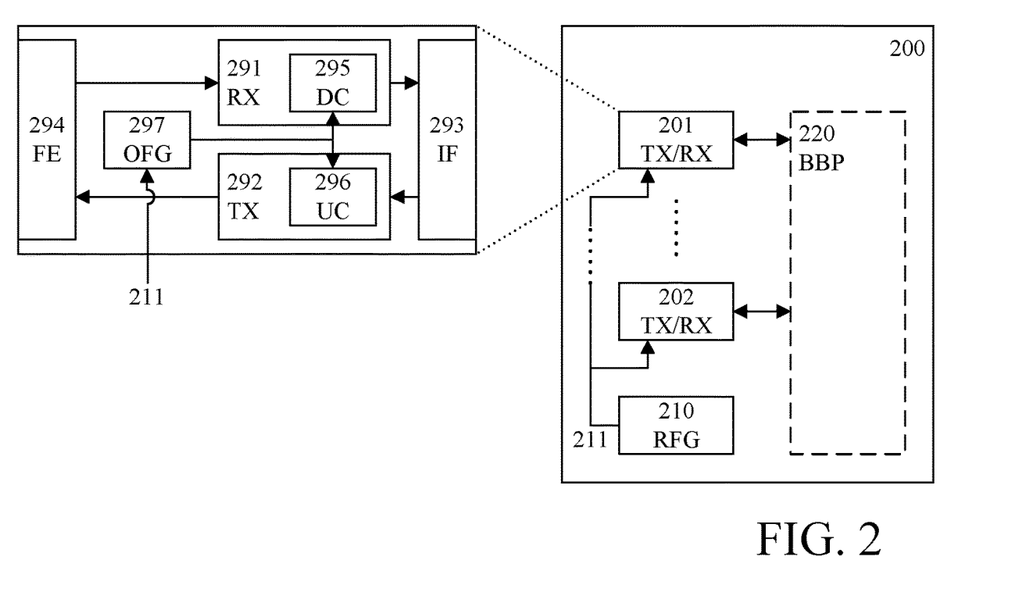
FIG. 2 is a schematic block diagram illustrating an example multi-antenna transceiver system according to some embodiments.

FIG. 2 schematically illustrates an example multi-antenna transceiver system 200 according to some embodiments. The example system 200 has a plurality (e.g., a group) of transceiver chips (TX/RX) 201, 202 and a reference frequency generator (RFG) 210. The example system 200 may also comprise a baseband processor (BBP) 220 configured to process transceiver signals for the transceiver chips. For example, the baseband circuitry may comprise one or more baseband processing chips.

Similarly to the frequency generator 110 of FIG. 1, the reference frequency generator 210 is configured to provide a signal indicative of a frequency to each of the transceiver chips.

However, in contrast to the system 100 of FIG. 1, the frequency provided by the reference frequency generator 210 in the example system 200 is a reference frequency 211, which is lower than the conversion frequency to be used for on-chip conversion in each of the transceiver chips (compare with 111 of FIG. 1). The reference frequency generator 210 may be implemented in any suitable way. For example, the reference frequency generator 210 may be a crystal oscillator (XO) and/or a voltage-controlled oscillator. Providing a relatively low frequency between chips typically causes less power dissipation and/or interference than providing a relatively high frequency between chips.

Similarly to the example schematic architecture for a transceiver chip 101, 102 in FIG. 1, an example architecture for the transceiver chips 201, 202 comprises a front end (FE) 294, an interface (IF) 293, a receiver path (RX) 291 and a transmitter path (TX) 292, wherein the receiver path comprises a down-converter (DC) 295 and the transmitter path comprises an up-converter (UC) 296.

The receiver path 291 and the transmitter path 292 may generally comprise any suitable functional and/or physical components. The receiver path may, for example, comprise a low-noise amplifier (LNA), mixer circuitry (for down-conversion), one or more filters (e.g., a low-pass filter; LPF), a variable gain amplifier, and possibly an analog-to-digital converter (ADC) instance.

The transmitter may, for example, comprise one or more filters (e.g., a low-pass filter; LPF), mixer circuitry (for up-conversion), a power amplifier (PA) and possibly a digital-to-analog converter (DAC) instance.

The interface 293 is for connection to the baseband processor 220, and can have any suitable functional and/or physical components.

The front-end 294 may be for connection to one or more antenna elements or may comprise one or more on-chip antenna elements. Thus, each transceiver chip 201, 202 of the multi-antenna transceiver system 200 is associated with one or more corresponding antenna elements. Furthermore, the front-end 294 may comprise any suitable functional and/or physical components. For example, the front end 294 may comprise duplexer or diplexer circuitry (e.g., switching circuitry, filters, etc.) for separation of received signals from signals to be transmitted.

Generally, a duplexer or diplexer may be implemented with Surface-Acoustic Wave (SAW) technology, Bulk-Acoustic Wave (BAW) technology, with waveguide technology, with lumped RLC elements (on-chip and/or discrete components), and/or with transmission-lines.

In contrast to the example architecture of FIG. 1, the down-converter 295 and up-converter 296 of the example transceiver chip architecture of FIG. 2 each receives a conversion frequency (for on-chip frequency conversion of a transceiver signal) from an on-chip frequency generator (OFG) 297. The on-chip frequency generator 297 is configured to provide the conversion frequency based on the reference frequency 211 provided by the reference frequency generator 210. As mentioned above the conversion frequency is higher than the reference frequency, but on-chip provision of a relatively high frequency is much less problematic (e.g., regarding power dissipation and/or interference) than provision between chips.

Typically, the conversion frequency should be the same frequency for all of the transceiver chips. However, due to instantiation variations, the phase of the signal indicating the respective conversion frequency for each transceiver chip may differ. Alternatively or additionally, there may be minor frequency differences between the respective conversion frequency provided for each transceiver chip due to instantiation variations.

Generally, the conversion frequency is higher than the reference frequency. Typically, the conversion frequency may be substantially higher than the reference frequency. For example, the conversion frequency may be higher than 24 GHz and/or the reference frequency may be lower than 1 GHz.

In the example of FIG. 2, the frequency generator configured to provide the conversion frequency is an on-chip frequency generator (i.e., implemented on the transceiver chip; which may be an integrated circuit—IC—chip, for example) and the reference frequency is provided to each transceiver chip.

In other embodiments, the frequency generator configured to provide the conversion frequency may be implemented separately from (e.g., on a separate chip), but associated with, the transceiver chip; and the reference frequency may be provided to the frequency generator (i.e., for the transceiver chip).

For example, a chip-associated frequency generator may be implemented on a separate chip included in the same package (e.g., an encapsulation) as the transceiver chip. One example of an implementation where a chip-associated frequency generator is implemented on a separate chip included in the same package as the transceiver chip is termed system in package (SIP).

Alternatively or additionally, a chip-associated frequency generator may be implemented on a separate chip with shorter and/or more efficient wiring to the transceiver chip (e.g., in package wiring) than the reference frequency generator would have.

In some embodiments, a chip-associated frequency generator may be shared by two or more—but not all—transceiver chips.

In some embodiments, the separate chip may implement other (e.g., digital) functionality in addition to the chip-associated frequency generation.

Both implementation possibilities—on-chip frequency generator and separate frequency generator—are included when referring to a chip-associated frequency generator.

Generally, the chip-associated frequency generator may be implemented using any suitable approach capable of generating an output frequency based on an input frequency. For example, the chip-associated frequency generator may be implemented using a phase-locked loop (PLL).

In the example of FIG. 2, the reference frequency is provided directly to each transceiver chip 201, 202 (corresponding to the reference frequency being provided directly to each chip-associated frequency generator in the general case). Thus, the reference frequency 211 is provided in a parallel manner to the transceiver chips.

Figure 3:
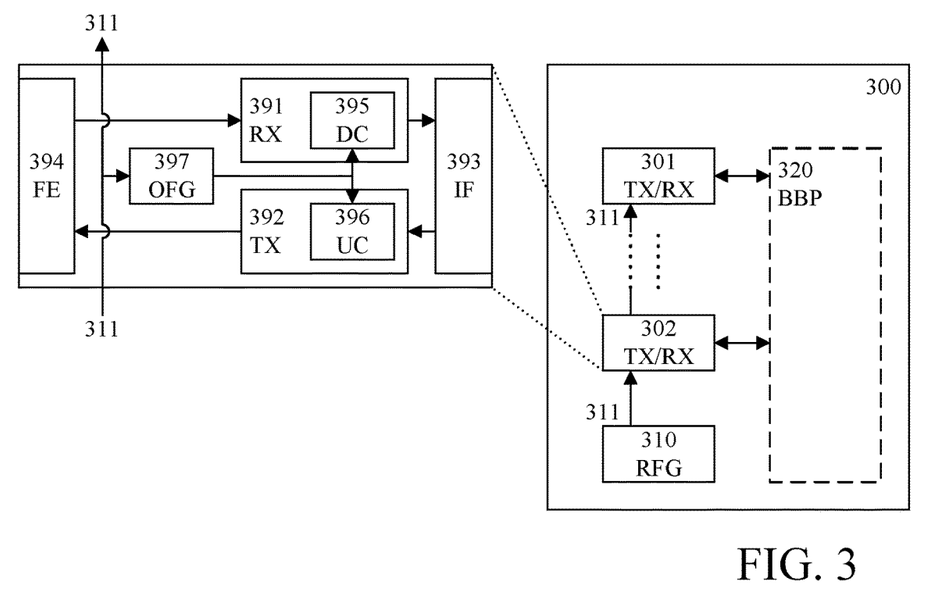
FIG. 3 is a schematic block diagram illustrating an example multi-antenna transceiver system according to some embodiments.

An alternative is illustrated in FIG. 3, where the reference frequency is provided directly to one, first, transceiver chip (or—generally—to one, first, chip-associated frequency generator) and to other transceiver chips (or—generally—to other chip-associated frequency generators) via the first transceiver chip (or—generally—via the first chip-associated frequency generator.

FIG. 3 schematically illustrates an example multi-antenna transceiver system 300 according to some embodiments. The example system 300 has a plurality (e.g., a group) of transceiver chips (TX/RX) 301, 302 and a reference frequency generator (RFG) 310. The example system 300 may also comprise a baseband processor (BBP) 320 configured to process transceiver signals for the transceiver chips. Any aspects of the baseband processor 220 described in connection to FIG. 2 may be applicable also for the baseband processor 320.

Similarly to the reference frequency generator 210 of FIG. 2, the reference frequency generator 310 is configured to provide a signal indicative of a reference frequency 311 to each of the transceiver chips. Any aspects of the reference frequency generator 210 described in connection to FIG. 2 may be applicable also for the reference frequency generator 310.

However, in contrast to the system 200 of FIG. 2, the reference frequency 311 is not provided directly to each transceiver chip 301, 302. Instead, the reference frequency 311 is provided directly only to a first transceiver chip 302, and via the first transceiver chip 302 to the other transceiver chips 301.

In a typical example, the reference frequency 311 is successively provided; from the first transceiver chip to a second transceiver chip, from the second transceiver chip to a third transceiver chip, and so on until the last transceiver chip (i.e., the reference frequency 311 is provided in a serial manner to the transceiver chips). However, other provision patterns are also possible (e.g., the reference frequency being provided from the first transceiver chip to more than one second transceiver chip).

Similarly to the example schematic architecture for a transceiver chip 201, 202 in FIG. 2, an example architecture for the transceiver chips 301, 302 comprises a front end (FE) 394, an interface (IF) 393, a receiver path (RX) 391 and a transmitter path (TX) 392, wherein the receiver path comprises a down-converter (DC) 395 and the transmitter path comprises an up-converter (UC) 396, each receiving a conversion frequency (for on-chip frequency conversion of a transceiver signal) from an on-chip, or—generally—chip-associated, frequency generator (OFG) 397. Any aspects of the example schematic architecture described in connection to FIG. 2 may be applicable also for the example schematic architecture of FIG. 3.

However, in contrast to the example architecture of FIG. 2, at least one (e.g., the first) transceiver chip (typically all transceiver chips) of FIG. 3 comprises a reference frequency output (in addition to a reference frequency input) for providing the reference frequency to one or more further (e.g., second) transceiver chips. In some embodiments, a signal at the reference frequency input is relayed and provided at the reference frequency output.

Put more generally, a package comprising a transceiver chip and a chip-associated frequency generator comprises a reference frequency input and a reference frequency output, the latter for providing the reference frequency to one or more further transceiver chip packages. Thus, wiring from the reference frequency input to the reference frequency output need not necessarily be on the transceiver chip itself.

An advantage with these embodiments is that the reference frequency signal routing effort (e.g., wiring length) on the PCB may be reduced, and/or that the risk of PCB leakage of the reference frequency signal may be reduced, and thereby less power loss and/or interference may be experienced.

In the examples of FIG. 2-3, the plurality of transceiver chips are all arranged in a single group and a single reference frequency generator provides the reference frequency for all of the transceiver chips.

Figure 4:
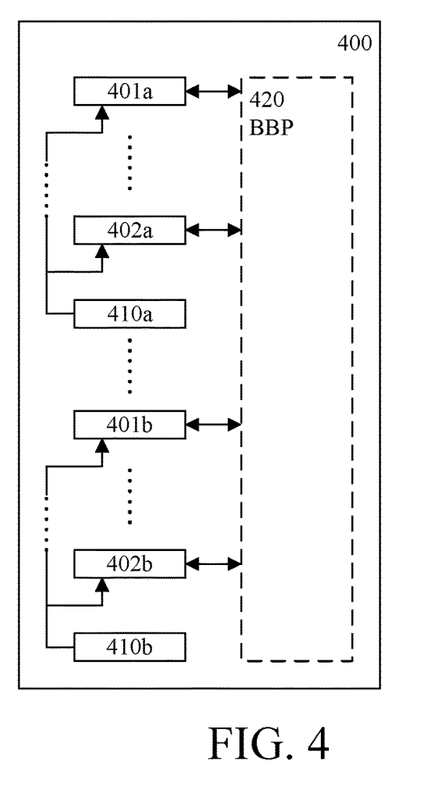
FIG. 4 is a schematic block diagram illustrating an example multi-antenna transceiver system according to some embodiments.
Figure 5:
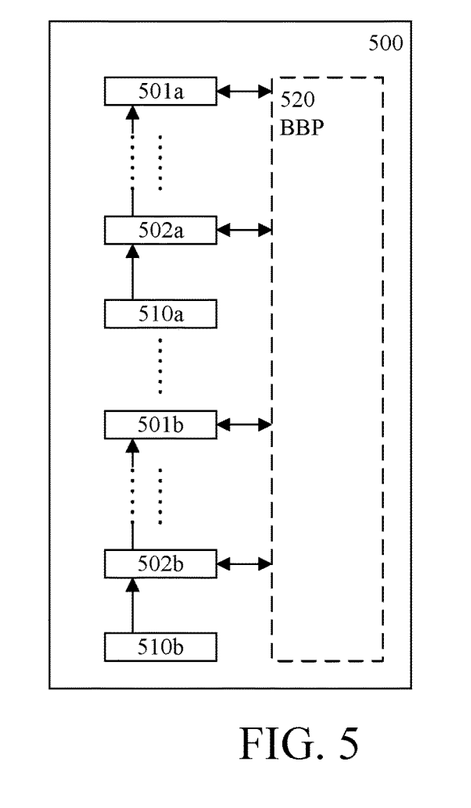
FIG. 5 is a schematic block diagram illustrating an example multi-antenna transceiver system according to some embodiments.

An alternative is illustrated in FIG. 4-5, where the plurality of transceiver chips of example multi-antenna transceiver systems 400, 500 are arranged in two or more groups—401a-402a and 401b-402b; 501a-502a and 501b-502b—and where each of two or more respective reference frequency generators (i.e., one reference frequency generator per group)—410a and 410b; 510a and 510b—provides the reference frequency for all of the transceiver chips in a corresponding group. The groups are typically disjunct (i.e., no transceiver chip is comprised in more than one group).

Generally, the reference frequencies may be the same for all groups, or may differ between at least two (e.g., some or all) of the groups.

By having the plurality of transceiver chips arranged in two or more groups (instead of one group), the wiring for provisioning of the reference frequency (e.g., total length of wiring and/or maximum wiring length from reference frequency generator to transceiver chip) may be reduced. Furthermore, the flexibility is increased. For example, such systems may be used for operation in multi-band scenarios (e.g., carrier aggregation and/or dual connectivity) by controlling the reference frequency generators to provide different reference frequencies.

Any aspects of the example systems described in connection to FIG. 2 or 3 may be applicable also for the example systems of FIG. 4-5; e.g., relating to a baseband processor (BBP) 420, 520, example architecture of the transceiver chips (or transceiver chip packages), frequency characteristics, etc. In this regard, it is noted that the system 400 of FIG. 4—where the reference frequency is provided in a parallel manner to the transceiver chips for each group—can be compared with the one-group system 200 of FIG. 2, and the system 500 of FIG. 5—where the reference frequency is provided in a serial manner to the transceiver chips for each group—can be compared with the one-group system 300 of FIG. 3.

Figure 6:
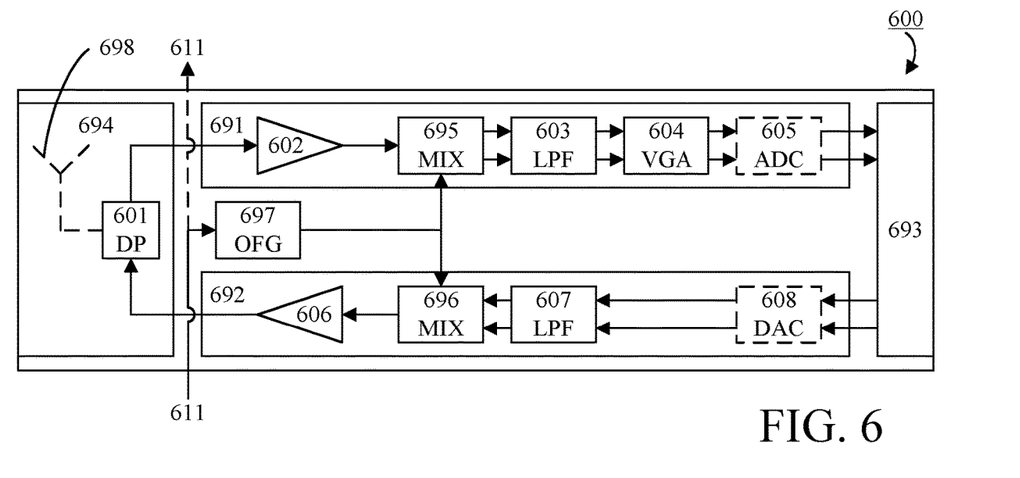
FIG. 6 is a schematic block diagram illustrating an example transceiver chip for a multi-antenna transceiver system according to some embodiments.

FIG. 6 schematically illustrates an example transceiver chip 600 for a multi-antenna transceiver system according to some embodiments. For example, the transceiver chip 600 may be used as any of the transceiver chips of FIG. 2-5.

The transceiver chip 600 comprises a front end 694, an interface 693, a receiver path 691 and a transmitter path 692.

The receiver path 691 comprises a low-noise amplifier 602, a down-converter in the form of a mixer (MIX) 695, a low-pass filter (LPF) 603, a variable gain amplifier (VGA) 604, and possibly an analog-to-digital converter (ADC) instance 605.

The transmitter path 692 comprises a low-pass filter (LPF) 607, an up-converter in the form of a mixer (MIX) 696, a power amplifier 606, and possibly a digital-to-analog converter (DAC) instance 608.

The interface 693 is for connection to baseband processing circuitry, and can have any suitable functional and/or physical components. The interface 693 is a digital interface when an ADC instance 605 and a DAC instance 608 are comprised on the transceiver chip, and the interface 693 is an analog interface when the transceiver chip does not comprise any ADC or DAC (ADC/DAC may be implemented in separate circuitry or in the baseband processing circuitry).

As illustrated by the dashed schematic antenna element 698 in FIG. 6, the front-end 694 may be for connection to one or more antenna elements (e.g., via an antenna port of the transceiver chip) or may comprise one or more on-chip antenna elements. Thus, the transceiver chip 600 is associated with one or more corresponding antenna elements.

Furthermore, the front-end 694 may comprise any suitable functional and/or physical components. For example, the front end 694 may comprise duplexer or diplexer circuitry (DP) 601 for separation of received signals from signals to be transmitted.

The down-converter mixer 695 and up-converter mixer 696 of the transceiver chip 600 each receives a conversion frequency (for on-chip frequency conversion of a transceiver signal) from an on-chip (or otherwise chip-associated) frequency generator (OFG) 697. As explained above, the on-chip frequency generator 697 is configured to provide the conversion frequency based on a reference frequency 611 provided to the transceiver chip 600. Put more generally, the chip-associated frequency generator is configured to provide the conversion frequency based on a reference frequency provided to the chip-associated frequency generator for the transceiver chip.

In similarity to the example architecture of FIGS. 3 and 5, the transceiver chip 600 may comprise a reference frequency output (in addition to a reference frequency input) for providing the reference frequency 611 to one or more further transceiver chips. Put more generally, a package comprising a transceiver chip and a chip-associated frequency generator may comprise a reference frequency input and a reference frequency output, the latter for providing the reference frequency to one or more further transceiver chip packages.

In some embodiments, a transceiver chip for time division duplex (TDD) operation comprises a transmitter path and a receiver path, wherein at least one of a single filter circuitry (e.g., a single quadrature filter circuitry; a pair of filters for in-phase/quadrature filtering) and a single mixer circuitry (e.g., a single quadrature mixer circuitry; a pair of mixers for in-phase/quadrature mixing) is shared by the transmitter path and the receiver path. Such a transceiver chip may, for example, be used for a multi-antenna transceiver system. Any aspects of other transceiver chip described herein (e.g., in connection with FIG. 6) may be applicable also for the transceiver chips of these embodiments.

This transceiver chip may be implemented by making the single mixer circuitry configurable (e.g., by a controller or baseband processor) in either of a reception mode and a transmission mode. In the reception mode, the mixer circuitry is configured to select a signal at a first input node for conversion, wherein the first input node is connected to the receiver path (e.g., an LNA output), and provide the mixed signal at a first output node of the mixer circuitry, wherein the first output node is connected to filter circuitry of the receiver path. In the transmission mode, the mixer circuitry is configured to select a signal at a second input node for conversion, wherein the second input node is connected to filter circuitry of the transmitter path, and provide the mixed signal at a second output node of the mixer circuitry, wherein the second output node is connected to the transmitter path (e.g., a PA input). If the filter circuitry is a single shared filter circuitry, the first output node and the second input node may coincide.

Alternatively or additionally, this transceiver chip may be implemented by making the single filter circuitry configurable in either of a reception mode and a transmission mode. In the reception mode, the filter circuitry is configured to select a signal at a first input node for filtering, wherein the first input node is connected to mixer circuitry of the receiver path, and provide the filtered signal at a first output node of the filter circuitry, wherein the first output node is connected to the receiver path (e.g., a VGA input). In the transmission mode, the filter circuitry is configured to select a signal at a second input node for filtering, wherein the second input node is connected to the transmitter path (e.g., an interface or DAC output), and provide the filtered signal at a second output node of the filter circuitry, wherein the second output node is connected to mixer circuitry of the transmitter path. If the mixer circuitry is a single shared mixer circuitry, the first input node and the second output node may coincide.

Thus, a transceiver chip for TDD operation may comprise a front end, an interface, a receiver path and a transmitter path. The receiver path may comprise a low-noise amplifier, a down-converter in the form of a shared mixer, a shared low-pass filter, a variable gain amplifier, and possibly an analog-to-digital converter. The transmitter path may comprise the shared low-pass filter, an up-converter in the form of the shared mixer, a power amplifier, and possibly a digital-to-analog converter.

The shared mixer of the transceiver chip receives a conversion frequency (for on-chip frequency conversion of a transceiver signal) from an on-chip (or otherwise chip-associated) frequency generator. In reception mode, the shared mixer selects a signal output from the LNA for conversion and provides the result to the shared low-pass filter. In transmission mode, the shared mixer selects a signal from the shared low-pass filter for conversion and provides the result at an input of the PA.

In an implementation of the shared low-pass filter, selectors (e.g., switches) control the filter operation to reception or transmission mode. In reception mode, a first selector is set to guide a signal provided by the mixer circuitry to an input of the actual filter circuit, and a second selector is set to guide a signal provided at the output of the actual filter circuit to a third selector, which is set to guide the signal provided by the second selector to the VGA. In transmission mode, the third selector is set to guide a signal provided by (the interface or DAC of) the transmitter path to the second selector, which is set to guide the signal provided by the third selector to an input of the actual filter circuit, and the first selector is set to guide a signal provided at the output of the actual filter circuit to the mixer circuitry.

In an alternative implementation of the shared low-pass filter, selectors (e.g., switches) control the filter operation to reception or transmission mode. In reception mode, a first selector is set to guide a signal provided by the mixer circuitry to a third selector, which is set to guide the signal provided by the first selector to an input of the actual filter circuit, and a second selector is set to guide a signal provided at the output of the actual filter circuit to the VGA. In transmission mode, the third selector is set to guide a signal provided by (the interface or DAC of) the transmitter path to an input of the actual filter circuit, the second selector is set to guide the signal provided at the output of the actual filter circuit to the first selector, which is set to guide the signal provided by the second selector to the mixer circuitry.

Figure 8:
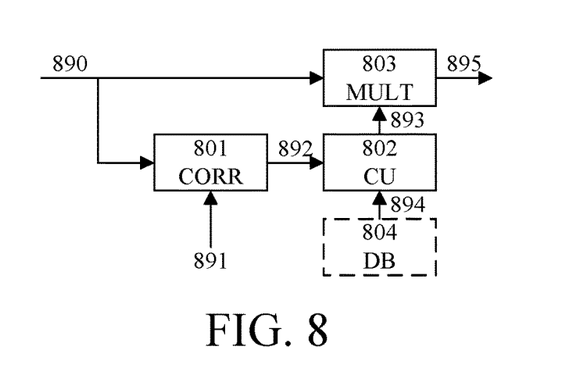
FIG. 8 is a schematic block diagram illustrating example phase shifter for a multi-antenna transceiver system according to some embodiments.

It should be noted that the example of FIG. 8 may be implemented with variations according to some embodiments. For example, one or more of the switches may be omitted and replaced by wiring nodes. Alternatively or additionally, the low-pass filter may comprise a single pair of in-phase/quadrature connection points for the VGA/DAC where distribution to either of the VGA or the DAC is via wiring nodes.

A controller (whether chip-associated or not) may be adapted to cause configuration of the shared mixer circuitry and the shared low-pass filter circuitry in reception or transmission mode.

Figure 7:
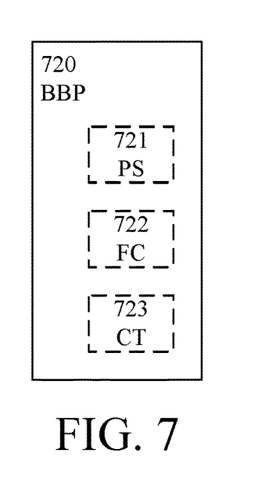
FIG. 7 is a schematic block diagram illustrating an example baseband processor for a multi-antenna transceiver system according to some embodiments.

FIG. 7 schematically illustrates an example baseband processor (BBP; e.g., baseband processing circuitry or a baseband processing module) 720 for a multi-antenna transceiver system according to some embodiments. For example, the baseband processor 720 may be used as any of the baseband processors of FIG. 2-5.

As mentioned above, the phase of the signal indicating the respective conversion frequency for each transceiver chip may differ due to instantiation variations. Thus, an unknown, chip-specific, phase $\varphi_i$ will phase shift the baseband signal $S_i(t)$ to $S_i(t)e^{j\varphi_i}$ for transceiver chip i, i=1, ..., N, compromising the possibilities for coherent operation (e.g., coherent combining for reception).

To mitigate any disadvantageous effect thereof, the baseband processor 720 may be configured to estimate a first respective phase shift of each respective transceiver chip (generally, for each chip-associated frequency generator) and compensate the transceiver signals based on the first respective phase shifts. The first respective phase shift for a chip-associated frequency generator may be determined in any suitable way, e.g., by correlation of a received signal with known signal content.

For example, the baseband processor may configure transceiver chip i to receive a signal corresponding to known signal content at the carrier frequency $f_c$, and correlate a down-converted version of the received signal with the known signal content to obtain the estimated first phase shift $\hat{\varphi}_i$ associated with the chip-associated frequency generator of transceiver chip i, i=1, ..., N.

To this end, the baseband processor may comprise a first phase shifter (PS; e.g., phase shifting circuitry or a phase shift module) 721. The first phase shifter may be configured to estimate the first respective phase shift of each respective chip-associated frequency generator and compensate the transceiver signals based on the first respective phase shifts.

Alternatively or additionally, the phase of the baseband signal for each transceiver chip may be affected differently due to the physical placement of the different transceiver chips/packages (e.g., causing different length of wiring between the reference frequency generator and the transceiver chips/packages and/or different physical positions of the antenna elements causing constructive or destructive combining). For example, such phase differences may be associated with the relative mounting positions of the transceiver chips/packages within a multi-antenna transceiver system.

To mitigate any disadvantageous effect thereof, the baseband processor 720 may be configured to acquire a second respective phase shift of each respective transceiver chip (generally, for each chip-associated frequency generator) and compensate the transceiver signals based on the second respective phase shifts.

To this end, the baseband processor may comprise a second phase shifter (PS; e.g., phase shifting circuitry or a phase shift module), which may be combined with the first phase shifter 721. The second phase shifter may be configured to acquire the second respective phase shift of each respective chip-associated frequency generator and compensate the transceiver signals based on the first respective phase shifts.

For example, the second respective phase shift of each respective chip-associated frequency generator may be pre-computed based on the relative physical positions of (e.g., distances between) the transceiver chips/packets and stored in a database or memory—e.g., in the form of a look-up table, LuT, providing a mapping between transceiver chip/packet and second respective phase shift—comprised in (or otherwise associated with) the baseband processor. Then, acquiring the second respective phase shift of each respective chip-associated frequency generator may comprise reading the corresponding values from the memory.

Generally, the compensation of (first and/or second) phase shifts is preferably made for each transceiver chip signal separately; before combining for signal reception, and before provision to the transceiver chips for signal transmission.

Alternatively or additionally, there may be minor frequency differences between the respective conversion frequency provided for each transceiver chip due to instantiation variations and/or between the respective conversion frequency(-ies) and the carrier frequency of the received radio signal.

To mitigate any disadvantageous effect thereof, the baseband processor 720 may be configured to estimate a frequency error for the chip-associated frequency generators and control the reference frequency generator based on the frequency error (e.g., by mapping the frequency error, via a look-up table for instance, to an electrical signal that can be fed to the reference frequency generator to update the reference frequency). The individual frequency error for a chip-associated frequency generator may be determined in any suitable way, e.g., by correlation of a received signal with known signal content.

Typically, a common (e.g., combined) frequency error value may be determined for all chip-associated frequency generators of a group (e.g., an average value of the individual frequency errors for each chip-associated frequency generator, or a selected one of the individual frequency errors), and the reference frequency generator may be controlled to eliminate the common frequency error value going forward.

To this end, the baseband processor may comprise a frequency controller (FC; e.g., frequency controlling circuitry or a frequency control module) 722. The frequency controller may be configured to estimate the frequency error for the chip-associated frequency generators and control the reference frequency generator based on the frequency error.

Alternatively or additionally, the baseband processor 720 may be further configured to estimate baseband correlation timing for at least one transceiver chip (generally, for at least one chip-associated frequency generator) and control baseband correlation for at least one other chip-associated frequency generator based on the estimated baseband correlation timing. The baseband correlation timing for a chip-associated frequency generator may be determined in any suitable way, e.g., by correlation of a received signal with known signal content.

Typically, a common (e.g., combined) baseband correlation timing value may be determined for all active chip-associated frequency generators of a group (e.g., an average value of the individual baseband correlation timings for each chip-associated frequency generator, or a selected one of the individual baseband correlation timings).

The baseband correlation timing value may, for example, be used to calibrate the correlation timing for one of the other chip-associated frequency generators (e.g., align the correlation timing for the other chip-associated frequency generator with the baseband correlation timing value). This may be particularly useful to achieve an initial correlation timing when the other chip-associated frequency generator is comprised in a transceiver chip/package is enabled (e.g., waking up from having been disabled a low-power mode).

Thus, the baseband correlation timing value (e.g., from one or some transceiver chips/packages) can be used as input value for a correlator unit of another transceiver chip/package, so that the correlation timing for the latter is based on the correlation timing value of the former.

To this end, the baseband processor may comprise a correlation timer (CT; e.g., correlation timing circuitry or a correlation timing module) 723. The correlation timer may be configured to estimate the baseband correlation timing for at least one transceiver chip and control baseband correlation for at least one other chip-associated frequency generator based on the estimated baseband correlation timing.

FIG. 8 schematically illustrates an example phase shifter for a multi-antenna transceiver system according to some embodiments. For example, a collection of phase shifters according to FIG. 8 (e.g., one per transceiver chip) may be used as the phase shifter 721 of FIG. 7.

The phase shifter of FIG. 8 comprises a correlator (CORR; e.g., correlating circuitry or a correlation module) 801 which is configured to correlate a received signal 890 with known signal content 891 (e.g., for a reference signal, a pilot signal, or a synchronization signal) to estimate a first phase shift $\hat{\varphi}_i$ 892.

The correlator may, for example, comprise a matched filter and the correlation process may comprise matching the received baseband signal $S_i(t)e^{j\varphi i}$ to the known signal content under a plurality k=1, . . . , K of phase shift hypotheses $\varphi_i^{(k)}$, wherein the hypothesis that results in the largest correlation peak may be assumed to be closest to the actual phase shift $\varphi_i$.

The phase shifter also comprises a control unit (CU; e.g., controlling circuitry or a control module) 802 configured to provide a phase shifting signal 893 based on the first phase shift 892; e.g., the complex conjugate of the first phase shift $e^{-j\varphi i}$.

Optionally, the control unit 802 is further configured to acquire a second phase shift 894 $\varphi(D_i)$ from a database (DB) 804. Then, the phase shifting signal 893 may be further based on the second phase shift 894. For example, phase shifting signal 893 may be based on a sum of, or difference between, the first phase shift 892 and the second phase shift 894; e.g., the complex conjugate of the sum $e^{-j(\varphi i+\varphi(D_i))}$, or of the difference $e^{-j(\varphi i-\varphi(D_i))}$.

As mentioned before, the second phase shift 894 may relate to the relative physical positions of the transceiver chips/packets. For example, the second phase shift 894 may be based on a distance $D_i$ i=1, . . . , N from a reference point of the multi-antenna system to the respective transceiver chip/package.

When the compensation is aimed at phase shifts introduced by transfer wiring from the reference frequency generator to the respective chip-associated frequency generators, the reference point may be the reference frequency generator, for example.

Depending on the incoming direction of the radio signal, different radio channel phases are introduced, wherein a radio channel phase difference between transceiver chips/packages depends on the carrier frequency (i.e., the wavelength of the radio signal) as well as on the relative positions/coordinates of the antenna elements.

When the compensation is aimed at phase shifts introduced by the relative positions/coordinates of the antenna elements (possibly comprised in respective transceiver chips/packages), the reference point may be the position of one of the antenna elements (possibly corresponding to the position of one of the transceiver chips/packages; e.g., on a PCB).

The phase shifter also comprises a multiplier (MULT; e.g., multiplying circuitry or a multiplication module) 803 configured to multiply the received signal 890 with the phase shifting signal 893, thereby compensating for the first (and possibly second) phase shift. Hence, if the estimation of the first phase shift and the acquired second phase shift are correct, a properly phase-compensated compensated signal $S_i(t)$ 895 is provided. Other variants include compensating for the second phase shift only.

The correlator 801 may, alternatively or additionally, be used to estimate an individual frequency error (e.g., for controlling the reference frequency generator) and/or an individual baseband correlation timing (e.g., for controlling the baseband correlation of one or more un-synchronized transceiver chip); compare with 722 and/or 723 of FIG. 7.

The correlator may, for example, comprise a matched filter and the correlation process may comprise matching the received baseband signal $S_i(t)e^{j\Delta f_i t}$ to the known signal content under a plurality l=1, . . . , L of frequency error hypotheses $\Delta f_i^{(l)}$, wherein the hypothesis that results in the largest correlation peak may be assumed to be closest to the actual frequency error $\Delta f_i$.

To achieve correlation of a received signal 890 with known signal content 891, the known signal content may be transmitted from a transmitter which is separate from the multi-antenna system under consideration (e.g., and external transmitter such as network node not comprising the multi-antenna system). The known signal content may, for example, relate to a reference signal, a pilot signal, or a synchronization signal—such as primary and/or secondary synchronization signals (PSS/SSS; e.g., as transmitted in synchronization signal bursts in fifth generation new radio, 5G-NR).

Alternatively, to achieve correlation of a received signal 890 with known signal content 891, one (or some) of the transceiver chips/packages may be configured (e.g., by the baseband processor) to transmit the known signal content, and the correlation may be performed for the other transceiver chips/packages acting as receivers. The known signal content may, for example, relate to a reference signal, a pilot signal, or a synchronization signal as above. Alternatively, the known signal content may relate to an arbitrary signal since it is inherently known by the multi-antenna system under consideration.

To summarize, according to some embodiments, a baseband processor is configured to control a multi-antenna transceiver system comprising at least two transceiver chips/packages. The control is for beamforming and/or Massive-MIMO communication (transmission and/or reception), and may be achieved by configuring the transceiver chips/packages to simultaneously receive or transmit a radio signal on the same carrier frequency in the at least two of the transceiver chips/packages.

Typically, the configuration is such that all transceiver chips/packages simultaneously receive or simultaneously transmit, but the baseband processor might also configure a first subset of transceiver chips/packages to simultaneously transmit and a second subset of transceiver chips/packages to simultaneously receive.

Each transceiver chip/package comprises a respective chip-associated frequency generator (e.g., a local oscillator, LO) that generates a carrier frequency signal, which should typically have substantially the same frequency for all of the transceiver chips/packages. The chip-associated LO signal may be used for down-converting (in a mixer) a radio signal received via an antenna element of (e.g., integrated within) the transceiver chip/package to a baseband or intermediate frequency signal, and/or for up-converting (in a mixer) a baseband or intermediate frequency signal to a radio signal to be transmitted via an antenna element of (e.g., integrated within) the transceiver chip/package.

The chip-associated LO signals are generated based on the same reference frequency (typically by using a phase-locked loop, PLL). The reference frequency is generated by a single reference frequency generator (e.g., a crystal oscillator, XO), which is shared by at least some (e.g., all) of the transceiver chips/packages.

In some embodiments, the reference frequency is controllable (e.g., by the baseband processor) via an electrical input signal. Thereby, it is possible to tune the reference signal based on an estimated frequency error of the LO signals.

Some embodiments relate to a multi-antenna transceiver system comprising a baseband processor (e.g., a baseband processing unit) and a first group of two or more transceiver chips. Each transceiver chip has a chip-associated (e.g., comprises an on-chip) frequency generator (e.g., a local oscillator, LO) configured to generate a first carrier frequency (which is substantially the same carrier frequency for each transceiver chip). The first carrier frequency is for down-converting (e.g., in a mixer) a received radio signal to a signal with a lower carrier frequency than the first carrier frequency and/or for up-converting (e.g., in a mixer) a signal with a lower carrier frequency than the first carrier frequency to a radio signal to be transmitted. The first carrier frequencies of the at least two transceiver chips are generated based on a same reference frequency, generated by a single reference frequency generator (e.g., a crystal oscillator, XO). The baseband processor is further configured to—simultaneously for the at least two transceiver chips—process reception and/or transmission of a radio frequency signal. The transmission/reception of the radio frequency signal is typically using the same, second, carrier frequency (which may be equal to the first carrier frequency when the signal with a lower carrier frequency than the first carrier frequency is a baseband signal, or may be higher than the first carrier frequency when the signal with a lower carrier frequency than the first carrier frequency is an intermediate frequency signal, for example).

An advantage with these embodiments is that routing, on a PCB, of a reference frequency signal with a frequency below, e.g., 1 GHz introduces less interference problem than routing of a first carrier frequency signal (e.g., the conversion signal) with a mmWave frequency. The PCB design becomes easier, which is especially applicable for massive MIMO and beamforming implementations for a mobile device or an Internet-of-Things (IoT) device. Furthermore, when the second carrier frequency is equal to the first carrier frequency, direct conversion is applied between the radio frequency carrier and baseband, which enables a low-complexity implementation of the transceiver chips.

Some embodiments further relate to the baseband processor configuring transceiver chip i to receive a signal corresponding to a known signal content (e.g., a reference signal) on the second carrier frequency. Based on correlation of a down-converted version of the received signal towards the signal content, the baseband processor obtains a phase shift $\hat{\varphi}_i$ which is associated with the first carrier frequency signal generated by the chip-associated frequency generator of the transceiver chip i. Thus, a phase shift estimator of the baseband processor enables the baseband processor to compensate for the respective phase shifts $\hat{\varphi}_i$ in relation to the signals of each individual transceiver chip.

An advantage with these embodiments is that coherent combining is enabled for reception, which is beneficial when optimizing the beamforming.

Some embodiments further relate to the signal corresponding to a known signal content being generated by an external transmitter (e.g., a transmitter not controlled by the baseband processor).

An advantage with these embodiments is that the implementation may be simplified since there is no internal generation of a signal corresponding to a known signal content.

Some embodiments further relate to the baseband processor also configuring transceiver chip j, j≠i, to transmit the signal corresponding to a known signal content using the second carrier frequency.

An advantage with these embodiments is that the phase offset estimation is improved—and thereby performance advantages in the beamforming step may be achieved—since the transmitted signal is fully known and/or since the radio transfer channel is closer to a perfect channel than when the signal corresponding to a known signal content is generated by an external transmitter.

Some embodiments further relate to the baseband processor being configured to estimate a frequency error based on correlation, and send an electrical signal based on the frequency error to the reference frequency generator; to update the reference frequency.

An advantage with these embodiments is that the frequency error of received signals may be reduced—and thereby improved performance may be achieved.

Some embodiments further relate to the baseband processor being configured to determine a timing value based on correlation for one transceiver chip, and use the timing value to set a correlation timing for another transceiver chip.

An advantage with these embodiments is that the timing error of correlation may be reduced—and thereby improved performance may be achieved.

Some embodiments further relate to the baseband processor being configured to apply (e.g., in combination with the phase shifts $\hat{\varphi}_i$) a phase compensation $\varphi(D_i)$ obtained from storing (e.g., a look-up table). The phase compensation $\varphi(D_i)$ may, for example, be based on the relative positions of the transceiver chips.

An advantage with these embodiments is that it may be easier to discriminate between the phase shift caused by the chip-associated frequency generator and the phase shift originating from the radio channel.

Some embodiments further relate to the second carrier frequency being above 24 GHz and the reference frequency being below 1 GHz.

An advantage with these embodiments is that having a relatively low frequency for the signal routed from the reference frequency generator to the respective transceiver chips may reduce interference on PCB (and thereby enables simplified design), may reduce impact due to PCB process variations, and/or may reduce power consumption in the routing (power loss is typically higher for routing of a relatively high frequency signal).

Some embodiments further relate to the reference frequency generator being serially connected to the transceiver chips (i.e., the reference frequency is input directly to a first transceiver chip, is input to a second transceiver chip from an output of the first transceiver chip, is input to a third transceiver chip from an output of the second transceiver chip, etc.).

An advantage with these embodiments is that the serial connection may reduce the reference frequency signal routing effort (e.g., wiring length) on the PCB, and/or may reduce the risk of PCB leakage of the reference frequency signal, and thereby less power loss and/or interference may be experienced.

Some embodiments further relate to the multi-antenna transceiver system comprising a second reference frequency generator (e.g., a second XO) and a second group of two or more other transceiver chips. Each transceiver chip has a chip-associated (e.g., comprises an on-chip) frequency generator (e.g., a local oscillator, LO) configured to generate a third carrier frequency (which may be equal to, or different from, the first carrier frequency). The third carrier frequency is for down-converting (e.g., in a mixer) a received radio signal to a signal with a lower carrier frequency than the third carrier frequency and/or for up-converting (e.g., in a mixer) a signal with a lower carrier frequency than the third carrier frequency to a radio signal to be transmitted. The third carrier frequencies of the at least two transceiver chips are generated based on a same reference frequency, generated by the second reference frequency generator.

An advantage with these embodiments is that partitioning the transceiver chips into two or more subsets (groups), where each subset has its own reference frequency signal, may reduce the reference frequency signal routing effort on the PCB and/or reduce the risk of interference generated from PCB leakage of the reference frequency signal.

Figure 9:
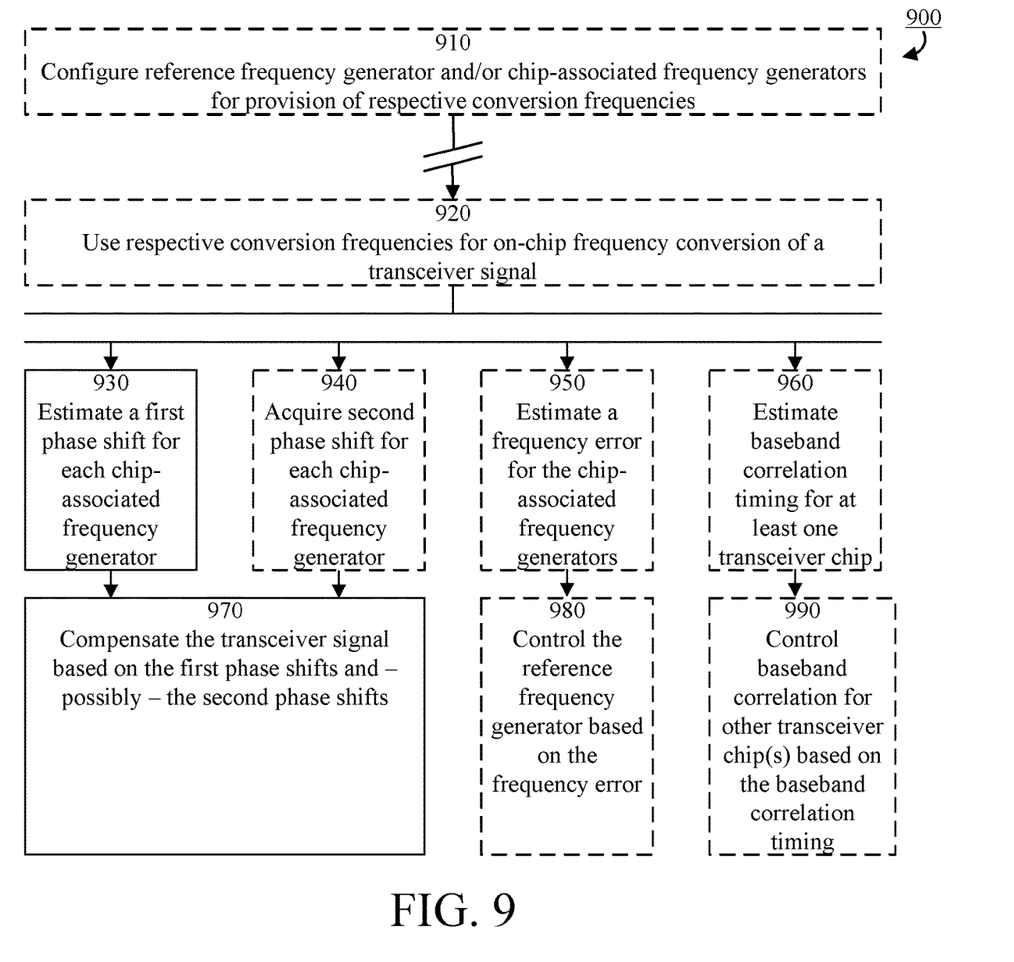
FIG. 9 is a flowchart illustrating example method steps according to some embodiments.

FIG. 9 illustrates an example method 900 according to some embodiments. For example, at least some of the steps of the method 900 may be performed, or caused, by controlling circuitry (e.g., comprised in, or associated with, the baseband processor) of a multi-antenna transceiver system, such as any of the multi-antenna transceiver systems of FIG. 2-5.

Thus, the method 900 is for operating a multi-antenna transceiver system comprising a group of transceiver chips and a reference frequency generator, wherein the reference frequency generator is configured to provide a reference frequency for each transceiver chip of the group and each transceiver chip has a respective chip-associated frequency generator configured to provide a respective conversion frequency based on the reference frequency for on-chip frequency conversion of a transceiver signal.

In optional step 910, reference frequency generator(s) and/or chip-associated frequency generators of the multi-antenna transceiver system are configured for provision of the respective conversion frequencies, as elaborated on above. This step may be performed before operation of the multi-antenna transceiver system commences, and/or during operation of the multi-antenna transceiver system (e.g., periodically and/or event-triggered).

During operation of the multi-antenna transceiver system, the respective conversion frequencies are used for on-chip frequency conversion of a transceiver signal, as elaborated on above and illustrated by optional step 920.

In step 930, a first respective phase shift is estimated of each respective chip-associated frequency generator, as elaborated on above.

In optional step 940, a second respective phase shift is acquired for each respective chip-associated frequency generator, as elaborated on above.

In step 970, the transceiver signal is compensated based on the first respective phase shifts and, possibly, the second respective phase shifts, as elaborated on above.

Optional steps 950 and 980 illustrate estimation of a frequency error for the chip-associated frequency generators and control of the reference frequency generator based of the frequency error, as elaborated on above.

Optional steps 960 and 990 illustrate estimation of baseband correlation timing for at least one transceiver chip/package and control of baseband correlation timing for other transceiver chip(s)/package(s) based of the estimated baseband correlation timing, as elaborated on above.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a network node.

Embodiments may appear within an electronic apparatus (such as a wireless communication device or a network node) comprising arrangements, circuitry, and/or logic according to any of the embodiments described herein. Alternatively or additionally, an electronic apparatus (such as a wireless communication device or a network node) may be configured to perform methods according to any of the embodiments described herein.

Figure 10:
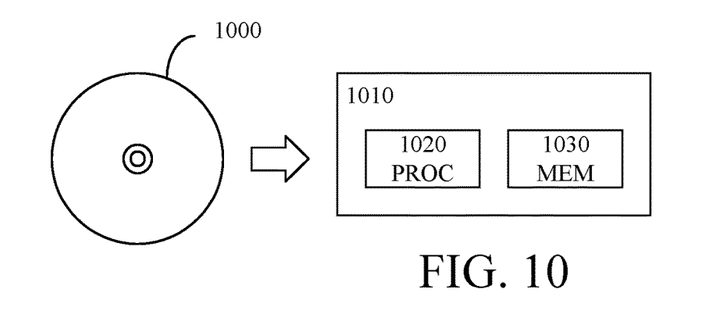
FIG. 10 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 10 illustrates an example computer readable medium in the form of a compact disc (CD) ROM 1000. The computer readable medium has stored thereon a computer program comprising program instructions. The computer program is loadable into a data processor (PROC; e.g., data processing circuitry or a data processing unit) 1020, which may, for example, be comprised in a wireless communication device or a network node 1010. When loaded into the data processor, the computer program may be stored in a memory (MEM) 1030 associated with or comprised in the data processor. According to some embodiments, the computer program may, when loaded into and run by the data processor, cause execution of method steps according to, for example, any of the methods illustrated in FIG. 9 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A multi-antenna transceiver system comprising:
   a group of transceiver chips, each transceiver chip comprising a digital interface;
   a reference frequency generator configured to provide a reference frequency for each transceiver chip of the group of transceiver chips, wherein the reference frequency is provided directly to a first transceiver chip of the group of transceiver chips, and wherein the reference frequency is provided via the first transceiver chip to a second transceiver chip of the group of transceiver chips, wherein the reference frequency is lower than 1 GHZ,
   wherein each transceiver chip has a respective chip-associated frequency generator configured to provide a respective conversion frequency based on the reference frequency, wherein each respective conversion frequency is higher than the reference frequency, and
   wherein each transceiver chip is configured to use the respective conversion frequency for on-chip frequency conversion of a transceiver signal; and
   digital baseband processing circuitry, connectable or connected to each of the digital interfaces, the digital baseband processing circuitry being configured to:
      process digitized transceiver signals for the transceiver chips,
      using the processed digitized transceiver signals, digitally estimate a first respective phase shift of each respective chip associated frequency generator, and
      digitally compensate the digitized transceiver signals based on the first respective phase shifts.

2. The multi-antenna transceiver system of claim 1, wherein the group of transceiver chips comprises two or more disjunct groups of transceiver chips and the reference frequency generator comprises a respective reference frequency generator for each group of transceiver chips.

3. The multi-antenna transceiver system of claim 1, wherein the digital baseband processing circuitry is further configured to:
   estimate a frequency error based on correlation with a received signal with known signal content for the respective chip-associated frequency generators; and
   control the reference frequency generator based on the frequency error.

4. The multi-antenna transceiver system of claim 1, wherein the digital baseband processing circuitry is further configured to:
   estimate baseband correlation timing for at least one transceiver chip; and
   control baseband correlation for at least one other transceiver chip based on the estimated baseband correlation timing.

5. The multi-antenna transceiver system of claim 1, wherein the digital baseband processing circuitry is further configured to:
   acquire a second respective phase shift for each transceiver chip; and
   compensate the transceiver signals based on the second respective phase shifts.

6. The multi-antenna transceiver system of claim 5, wherein the second respective phase shifts are associated with relative mounting positions of the transceiver chips.

7. The multi-antenna transceiver system of claim 1, wherein each respective conversion frequency is higher than 24 GHz.

8. A multi-antenna transceiver system comprising a digital baseband processor, the digital baseband processor being configured to:
   process digitized transceiver signals for a group of transceiver chips comprised in the multi-antenna transceiver system, wherein each transceiver chip comprises a digital interface, wherein each transceiver chip has a respective chip-associated frequency generator configured to provide a respective conversion frequency based on a reference frequency provided by a reference frequency generator comprised in the multi-antenna transceiver system, wherein each respective conversion frequency is higher than the reference frequency, wherein the reference frequency is provided directly to a first transceiver chip of the group of transceiver chips, and wherein the reference frequency is provided via the first transceiver chip to a second transceiver chip of the group of transceiver chips, wherein the reference frequency is lower than 1 GHz, wherein the digital baseband processor is connectable or connected to each of the digital interfaces, and wherein the baseband processor comprises baseband processing circuitry configured to:
   using the processed digitized transceiver signals, digitally estimate a first respective phase shift of each respective chip-associated frequency generator; and
   digitally compensate the digitized transceiver signals based on the first respective phase shifts.

9. A network node comprising the multi-antenna transceiver system of claim 1.

10. A wireless communication device comprising the multi-antenna transceiver system of claim 1.

11. A method for operating a multi-antenna transceiver system comprising a group of transceiver chips, digital baseband processing circuitry, and a reference frequency generator, the method comprising:
   providing, by the reference frequency generator, a reference frequency for each transceiver chip of the group of transceiver chips, wherein:
      the reference frequency is lower than 1 GHZ,
      the reference frequency is provided directly to a first transceiver chip of the group of transceiver chips,
      the reference frequency is provided via the first transceiver chip to a second transceiver chip of the group of transceiver chips,
      each transceiver chip has a respective chip-associated frequency generator configured to provide a respective conversion frequency based on the reference frequency, each respective conversion frequency being higher than the reference frequency, each transceiver chip is configured to use the respective conversion frequency for on-chip frequency conversion of a transceiver signal, each transceiver chip comprises a digital interface, and the digital baseband processing circuitry is connectable or connected to each of the digital interfaces;

processing, by the digital baseband processing circuitry, digitized transceiver signals from the transceiver chips;

using the processed digitized transceiver signals, digitally estimating, by the digital baseband processing circuitry, a first respective phase shift of each respective chip-associated frequency generator; and digitally compensating, by the digital baseband processing circuitry, the digitized transceiver signal based on the first respective phase shifts.

12. A computer program product comprising a non-transitory computer readable medium, having thereon a computer program comprising program instructions, the computer program being loadable into a data processing unit and configured to cause execution of the method according to claim 11 when the computer program is run by the data processing unit.

13. A network node comprising the multi-antenna transceiver system of claim 8.

14. A wireless communication device comprising the multi-antenna transceiver system of claim 8.

* * * * *

UNITED STATES PATENT AND TRADEMARK OFFICE
CERTIFICATE OF CORRECTION

PATENT NO. : 12,348,260 B2
APPLICATION NO. : 18/030737
DATED : July 1, 2025
INVENTOR(S) : Bengt Lindoff et al.

Page 1 of 1

It is certified that error appears in the above-identified patent and that said Letters Patent is hereby corrected as shown below:

In the Claims

Column 21, Line 31, Claim 1, "GHZ," should be -- GHz, --.

Column 22, Line 57, Claim 11, "GHZ," should be -- GHz, --.

Signed and Sealed this
Ninth Day of December, 2025

John A. Squires
*Director of the United States Patent and Trademark Office*